United States Patent [19]

Gruhler

[11] Patent Number: 4,459,755
[45] Date of Patent: Jul. 17, 1984

[54] MEASURING DEVICE

[75] Inventor: Siegfried Gruhler, Vöhringen, Fed. Rep. of Germany

[73] Assignee: Mauser-Werke Oberndorf GmbH, Fed. Rep. of Germany

[21] Appl. No.: 354,622

[22] Filed: Mar. 4, 1982

[30] Foreign Application Priority Data

Mar. 14, 1981 [DE] Fed. Rep. of Germany ....... 3109856

[51] Int. Cl.³ .............................................. F01B 5/14
[52] U.S. Cl. .................................................. 33/169 R
[58] Field of Search ................. 33/169 R, 170, 172 E, 33/174 L, 1 M, 166, 163, 164, 147 E, 147 N, 143 L; 192/88 PM, 56 R

[56] References Cited

U.S. PATENT DOCUMENTS

| 56,702 | 7/1866 | Campbell | 73/321 X |
|---|---|---|---|
| 2,624,122 | 1/1953 | Knobel | 33/164 R |
| 2,714,167 | 7/1955 | Herzog | 73/321 X |
| 3,353,275 | 11/1967 | Porath | 33/174 P |
| 3,400,462 | 9/1968 | Pobst | 33/126.6 |
| 3,483,626 | 12/1969 | Huttel | 33/172 E X |
| 3,636,277 | 1/1972 | Pohler | 192/84 PM X |
| 3,803,719 | 4/1974 | Nishina et al. | 33/172 R |
| 4,117,601 | 10/1978 | Kober et al. | 33/172 E |

FOREIGN PATENT DOCUMENTS

| 1132717 | 11/1956 | France | 192/84 PM |
|---|---|---|---|
| 425247 | 5/1967 | Switzerland | 33/169 R |
| 858063 | 1/1961 | United Kingdom . | |

Primary Examiner—Harry N. Haroian
Attorney, Agent, or Firm—McGlew and Tuttle

[57] ABSTRACT

A device for measuring the position of a member for example, the height thereof comprises a frame with a slide movable on said frame which carries a rigid measuring member. A motor is connected to drive the slide through a constant slip torque clutch connected between the motor and the slide. The clutch is a magnetic field clutch so that it urges the measuring member when it is in a measuring position against the object being measured so as to exert the measuring force thereon.

8 Claims, 8 Drawing Figures

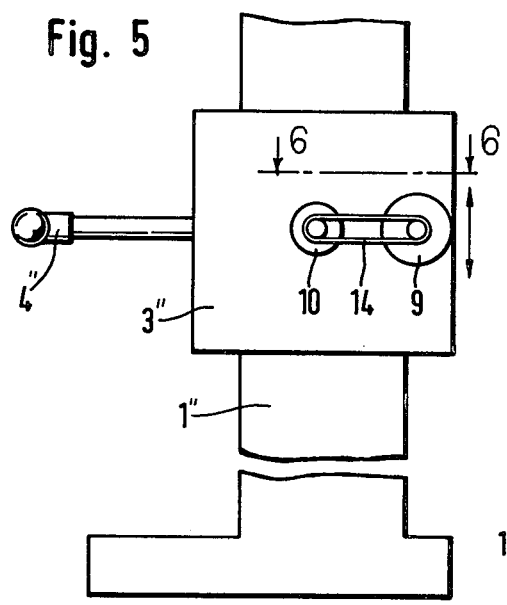
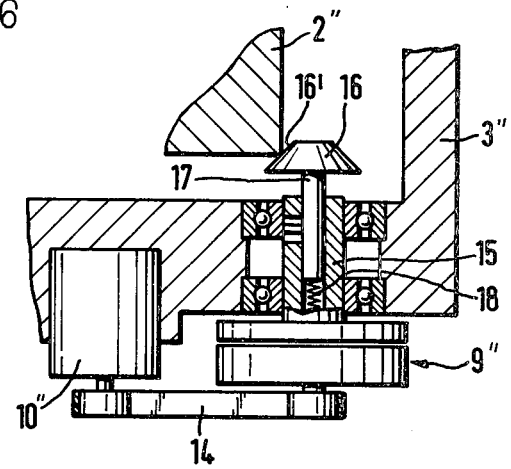
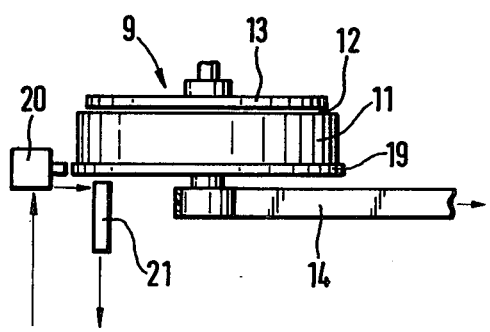
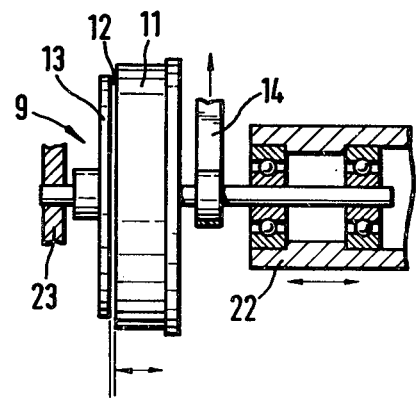

MEASURING DEVICE

FIELD AND BACKGROUND OF THE INVENTION

This invention relates in general to measuring devices and in particular to a new and useful device particularly for measuring the height of an object which includes a slide which is movably mounted relative to a frame which carries a rigid measuring member which is moved with the slide into abutment against the object to be measured and exerts a measuring force on the object.

A device of this kind is disclosed in German OS No. 28 50 875. In this prior art, the measuring contact element is secured to its slide resiliently through an intermediate member. To bring the measuring element into contact at a measuring point, the slide must be displaced by means of a hand wheel. The resilient connecting member is designed as a parallelogram of springs. The intermediate member carries a dimension reader and the frame carries the scale. To perform a measuring operation, the slide is displaced until, as the contact element butts against the measuring point, a mark of the intermediate member moves relative to marks of the slide. With a proper adjustment of the parallelogram, a measuring force independent of the adjustment of the slide may be obtained within a small tolerance range of the slide. A mechanical displacement of the measuring slide is practicable only with a special embodiment of this prior art device.

A similar height measuring device is described in German utility model No. 79 34 103. There again, spring elements are provided between the slide and a support carrying the contact element. The slide is driven by a motor. The motor is supposed to switch off when the contact element butts against the measuring point. A roughly constant measuring force can be obtained only by providing switching contact pieces at the contact points and on the housing of the support, forming circuit breaking elements to produce a pulse to be utilized for the control.

The prior art height measuring devices designed with resilient elements require a spring member guided for displacement on the slide. This is expensive. In addition, resilient elements restrict the applicability of mechanical drives.

In practice, slipping clutches have been provided for mechanically driving the slide. Only, as is well known, such clutches are not intended for the measuring operation proper, they are used as a safety against mechanical overloads.

From German OS No. 22 62 392, it is known to secure the measuring head through a feeler holder to a cable which is run over a pulley and carries a counterweight. The measuring head is displaced manually. For fine adjustment, the slide is provided, according to German OS No. 23 17 241, with a pinion and it is movable along a rack. For rapid motion and course adjustment, the slide must be disengaged from the rack.

SUMMARY OF THE INVENTION

The invention is directed to a height measuring device in which a biasing measuring force can be adjusted independently of the location of the measuring point and position of the slide corresponding thereto, and with a biasing force which remains constant over the entire measuring range.

To this end, the invention provides a constant slip torque clutch, e.g. a magnetic clutch for the drive of the measuring member. Such clutches are commercially available. Unlike friction-type slipping clutches, they exhibit an unusually constant slip torque, since the coupling is effected through a magnetic field, at both the input and output sides.

A slide with the measuring contact element is moved to the measuring point by the motor. As soon as the force with which the contact element comes to apply increases to the value of the slip torque of the magnetic field clutch, the clutch slips through. The motor keeps running and, through the clutch, holds the contact element against the measuring point. The applied measuring force is independent of the vertical position of the measuring point. A measured value is read between the frame and the slide. In the inventive design, the motor and the magnetic field clutch both drive the slide and produce the measuring force. At the same time, the construction of the device is simplified, since no resilient elements and no member guided on the slide and interposed between the contact element and the slide, are provided.

The measuring force acting on the measuring point is constant and reproducible, independently of the displacement of the slide.

In accordance of a feature of the invention a driving motor is mounted on a frame to drive a belt or similar movable member carrying the slide through a magnetic clutch. The magnetic clutch is set so that it will slip at a predetermined torque so that the measuring member carried by the slide which bears against the object to be measured at a measuring position will be applied with the predetermined measuring force.

Accordingly, it is an object of the invention to provide an improved measuring device particularly a height measuring device in which a rigid measuring member is carried on a slide which is movable on a frame and is moved by a driving motor acting through a constant slip torque clutch.

A further object of the invention is to provide a measuring device which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 5 is a elevational view of still another embodiment of the invention;

FIG. 6 is a partial sectional view taken along the line 6—6 of FIG. 5;

FIG. 7 is a partial plan view of the magnetic clutch showing and adjusting device therefor; and FIG. 8 is a view similar to FIG. 7 showing another embodiment of adjusting device.

DESCRIPTION OF THE PREFERRED EMBODIMENTS

Figure 1:
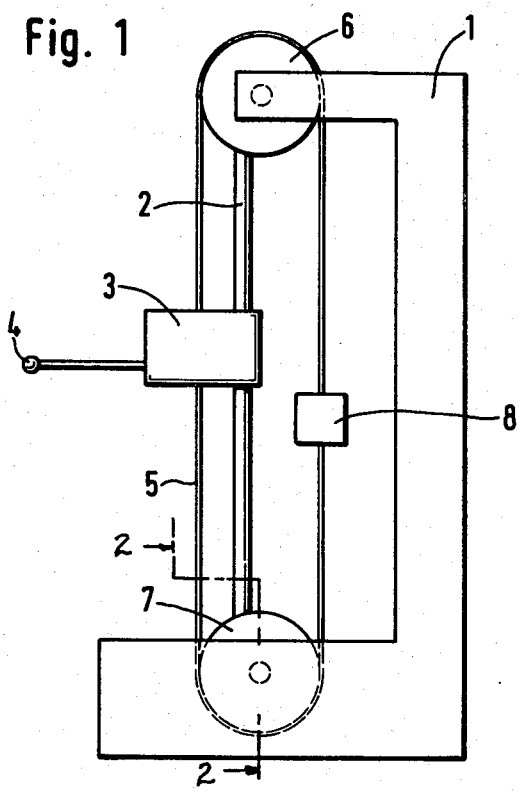
FIG. 1 is a side elevational view of a measuring device for measuring the height of an object constructed in accordance with the invention.
Figure 2:
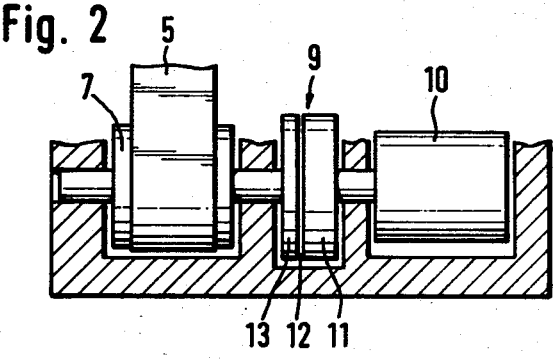
FIG. 2 is a section taken along the line 2—2 of FIG. 1.

Referring to the drawings in particular, the invention embodied therein comprises a measuring device particularly for measuring the height of an object which comprises a vertical frame 1 having a guide 2 extending between upper and lower portions of the frame on which is movable a slide 3 which carries a rigid measuring member 4. Slide 3 is moved to a measuring position in which the measuring member 4 bears against the object to be measured and exerts a measuring force on a measuring point. A motor 10 is provided for driving the slide through a magnetic field clutch 9 or a clutch which produces a constant slip torque drive.

A height measuring device comprises the frame 1 including the guide 2 on which measuring slide 3 is mounted for displacement. Rigidly secured to slide 3 is the measuring member 4. The measured values are read as a mutual position of slide 3 and frame 1 or guide 2, e.g. a scale on guide 2 as indicated by either the top surface or bottom surface of the slide.

In the embodiment of FIG. 1, slide 3 is affixed to, e.g. suspended from, an endless steel belt 5 which is trained over upper 6 and lower 7 guide pulleys of frame 1. On an opposite section of the endless steel belt 5, a counterweight 8 is secured which balances the weight of slide 3 and measuring member 4.

The lower guide pulley 7 is driven by electric motor 10 through a magnetic field clutch 9.

Magnetic field clutch 9 comprises a permanent magnet part 11 on its input side, and a metallic disc 13 on its output side. The magnetic field of part 11 acts on disc 13 through a gap 12.

Figure 3:
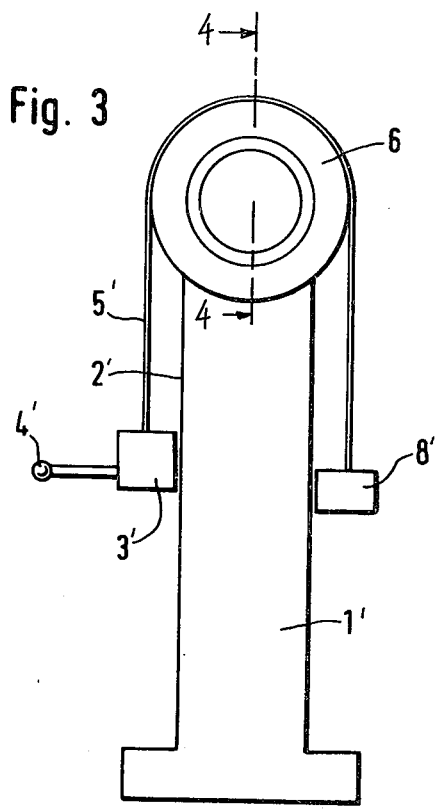
FIG. 3 is a side elevational view of another embodiment.
Figure 4:
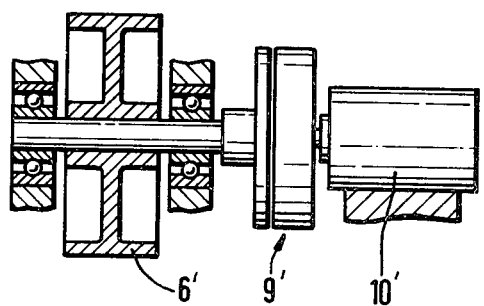
FIG. 4 is a section taken along the line 4—4 of FIG. 3.

In the embodiment of FIG. 3, a steel belt 5' is passed over only an upper guide pulley 6' which is driven through magnetic field clutch 9' by an electric motor 10' mounted on frame 1'.

In the embodiment of FIGS. 5 and 6, magnetic field clutch 9" and motor 10" are supported on slide 3", not on frame 1".

A belt drive 14 is provided between motor 10" and clutch 9". At the output side of clutch 9", a sleeve 15 is provided in which a shank 17 carrying a drive wheel 16 is non-rotatably received for axial displacement. Shank 17 is biased by a compression spring 18. Drive wheel 16 has a frusto-conical surface 16' which is urged by spring 18 into contact with an edge of guide 2". Guide 2" forms a part of frame 1" (FIGS. 5 and 6).

In the embodiment of FIGS. 5 and 6, it is advisable to provide a counterweight (not shown) equal to the total weight of slide 3", measuring member 4", and drive parts 10-18. In the same way as in the embodiment of FIGS. 1 and 3, a counterweight is guided on the frame 1" by means of a ball race, for example. The arrangement is similar to that of FIG. 1, or particularly, FIG. 3. A cable may be employed instead of steel belt 5.

As shown in FIGS. 7 and 8, a maximum torque which can be transmitted by magnetic field clutch 9 substantially depends on the position of the permanent magnets in part 11. Conventional clutches of this kind comprise an adjustment ring 19 for adjusting the maximum torque transmitted. FIG. 7 shows one possibility of such an adjustment controllable by an electronic device (not shown). A magnetic switch 20 is provided within the range of adjustment ring 19, by which upon an instruction from the control device, ring 19 is clamped. A crank contact head 21 is provided determining the relative angular displacement thereby caused between permanent magnet part 11 further driven by motor 10, and adjustment ring 19, and releasing the ring 19 through the control device again after the desired relative displacement has been accomplished.

The maximum torque transmissible by magnetic field clutch 9 may also be controlled by adjusting the air gap 12. FIG. 8 shows such an arrangement. The two parts 11 and 13 of clutch 9 are mounted separately, in bearings 22 and 23. Bearing 22 is axially displaceable by means of another drive (not shown) to adjust gap 12.

All the embodiments have the following common operating features:

Upon switching motor 10 on, slide 3 moves to the measuring point of the respective workpiece. Only a small torque is needed, since the weights are balanced. Upon contacting the measuring point, measuring member 4 is applied thereagainst by a measuring force. This force corresponds to the slip torque of magnetic field clutch 9. Due to the already mentioned balance in weight, a small measuring force may be provided, and it may be adjustable. During the measuring operation, motor 10 keeps running, so that measuring member 4 is continuously pressed against the measuring point. This measuring force does not vary, due to the properties of the magnetic field clutch, and remains constant over the entire measuring range. Further, this force is independent of the direction in which measuring member 4 approaches the measuring point, from below or from above, as well as of the speed at which slide 3 moves.

The measuring force is equal for all measurements, except for the possibility of readjusting.

It is advantageous that with the motor 10 switched off, a retaining torque is produced by the magnetic field clutch 9, and the self-locking state of the gear integrated in motor 10, so that slide 3 does not move spontaneously upon removing measuring member 4.

It is easy to change the position of slide 3 manually. Only the retaining torque of magnetic field clutch 9 is to be overcome to this end.

The height measuring devices as described in the foregoing are suitable for high resolutions within the measuring range. Even bores or shafts can be measured.

In the embodiment of FIG. 1, the device is very stable since the magnetic field clutch 9 and the motor 10 are provided at the bottom.

In the embodiment of FIG. 3, no particular operation for stretching the steel belt is needed.

In the embodiment of FIG. 5, oscillations which might propagate through a driven belt to slide 3 are prevented as from the beginning since slide 3 is driven directly. Compression spring 18 ensures the necessary friction grip between frusto-conical drive wheel 16 and the guide edge.

While specific embodiments of the invention have been shown and described in detail to illustrate the application of the principles of the invention, it will be understood that the invention may be embodied otherwise without departing from such principles.

What is claimed is:

1. A height measuring device comprising a frame, a slide mounted on said frame for vertical movement therealong, a measuring member rigidly connected to said slide and being displaceable with said slide on said frame, a motor for driving said slide and a constant slip torque clutch connected between said motor and said slide to drive said slide to a measuring position in which said measuring member exerts a constant measuring force on a measuring point, said constant slip torque clutch comprising a magnetic field clutch for producing constant torque, said magnetic field clutch including an adjusting ring, said ring being adjustable to vary the slip torque of the magnetic field clutch and thus the effective measuring force and including a magnetic switch for clamping said adjusting ring, said magnetic clutch including a permanent magnet part and a counterpart driven by said permanent magnet part and a crank contact head located adjacent said permanent magnet part for determining the angular displacement between it and said adjusting ring.

2. A measuring device according to claim 1, including a guide mounted on said frame, said slide being movable along said guide and a conveyor belt connected to said slide, guide means over which said conveyor belt is moved including a pulley driven by said motor through said magnetic field clutch, and a counterweight connected to said belt in a position to offset the weight of said slide and measuring member.

3. A measuring device according to claim 2, wherein said conveyor includes an upper and a lower pulley, said belt being trained over said upper and lower pulleys, said magnetic field clutch being connected to said lower pulley.

4. A measuring device according to claim 1, wherein said motor and said magnetic field clutch are mounted on said slide and move vertically with said slide, said measuring device including torque transmission means connected to said counterpart and engaged with said frame for moving said slide vertically on said frame with rotation of said counterpart.

5. A height measuring device comprising:
a frame;
a slide mounted on said frame for vertical movement therealong;
a measuring member rigidly connected to said slide and displaceable with said slide on said frame;
a motor mounted to said slide;
a magnetic member having a magnetic face and rotatably mounted to said slide;
rotation transmission means connected to said motor and said magnetic member for rotating said magnetic member with activation of said motor;
a counterpart member rotatably mounted to said slide having a facing surface facing said facing surface of said magnetic member and defining a gap therewith; and torque transmission means connected between said counterpart member and said frame for engaging said frame to move said slide vertically on said frame with rotation of said counterpart member;
said magnetic member and counterpart member being structured so that a constant torque is transmitted to said counterpart member from said magnetic member when said magnetic member is rotated by said rotation transmission means;
at least one of said magnetic member and said counterpart member being mounted for axial displacement for adjusting said air gap; and
said torque transmission means comprising a sleeve rotatably mounted to said slide and connected to said counterpart for co-rotation therewith, a shank axially movable in said slide and mounted for co-rotation with said slide and a drive wheel connected to said shank and engaged with said frame for moving said slide with respect to said frame with rotation of said drive wheel.

6. A measuring device according to claim 1, including a spring connected in said sleeve and engaged against said shank for biasing said shank to move said drive wheel into engagement with said frame.

7. A measuring device according to claim 6, wherein said drive wheel has a frusto-conical surface, said frame having an edge against which said frusto-conical surface is engaged, said frusto-conical surface being biased against said edge by the action of said spring.

8. A measuring device according to claim 7, wherein said rotation transmission means comprises a pulley connected to said motor, a pulley connected to said magnetic member and a belt trained around said pulleys.

* * * * *